Oct. 6, 1942.　　　　F. C. GEORGE　　　　2,298,006
MOLDING APPARATUS
Filed Dec. 28, 1939　　　　3 Sheets-Sheet 1
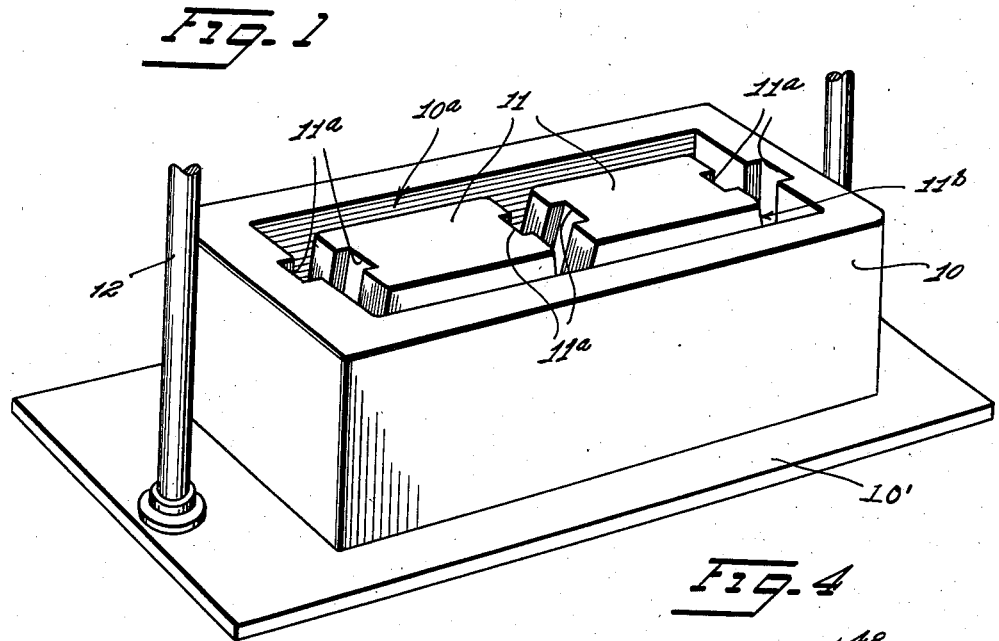
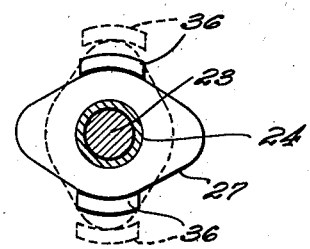
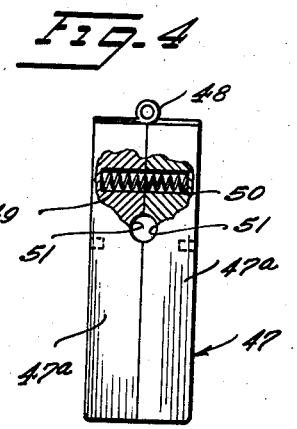
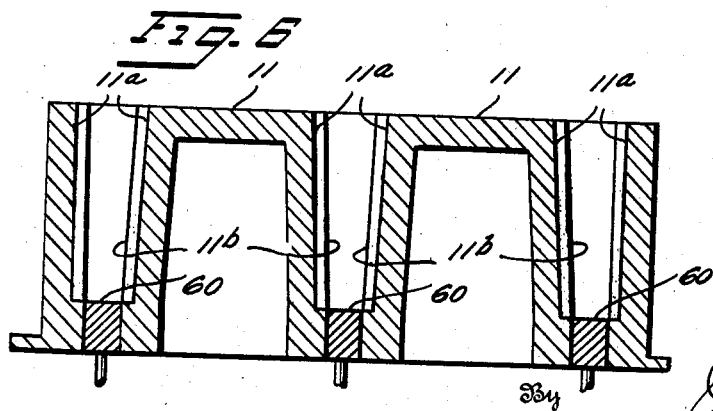

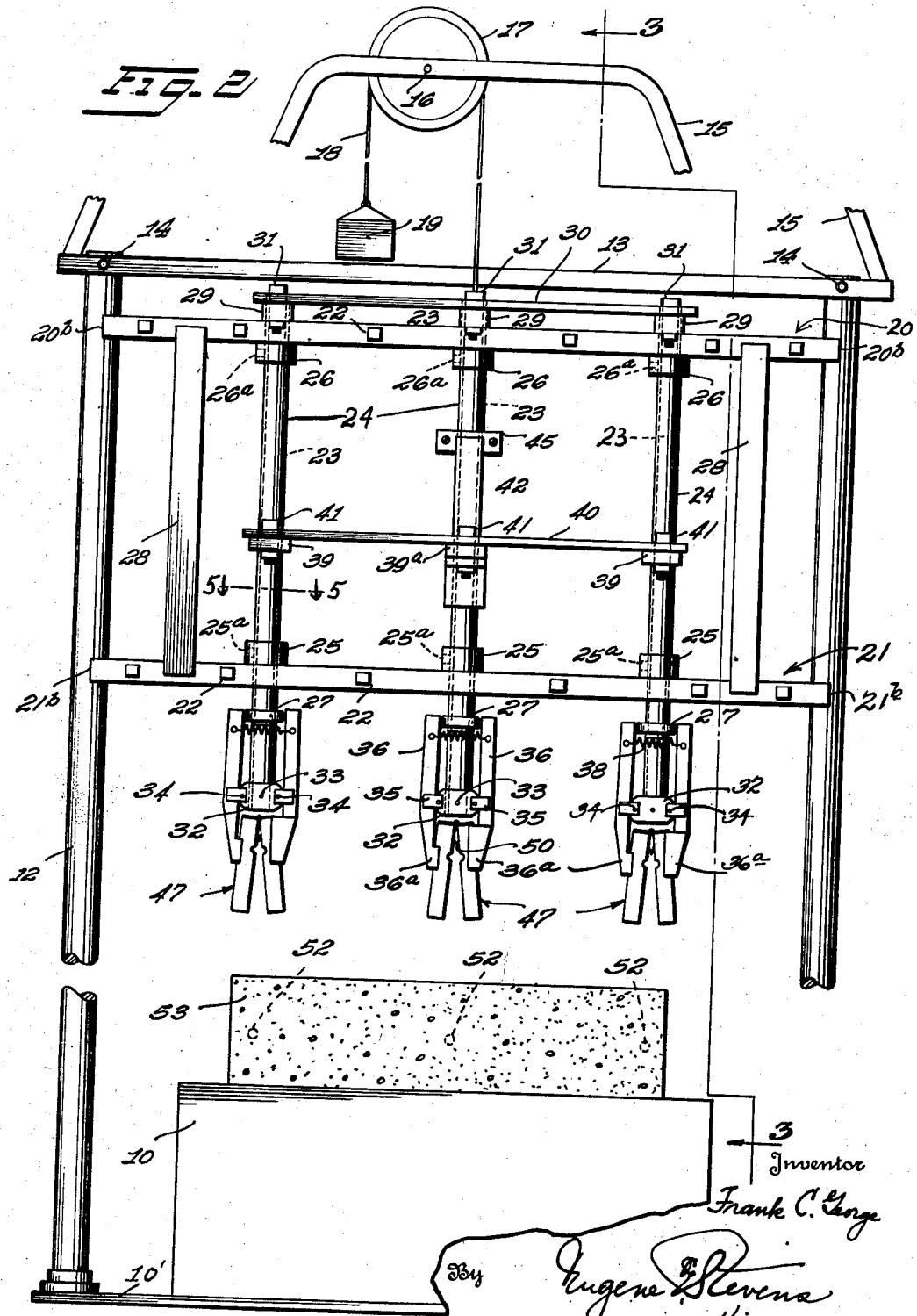

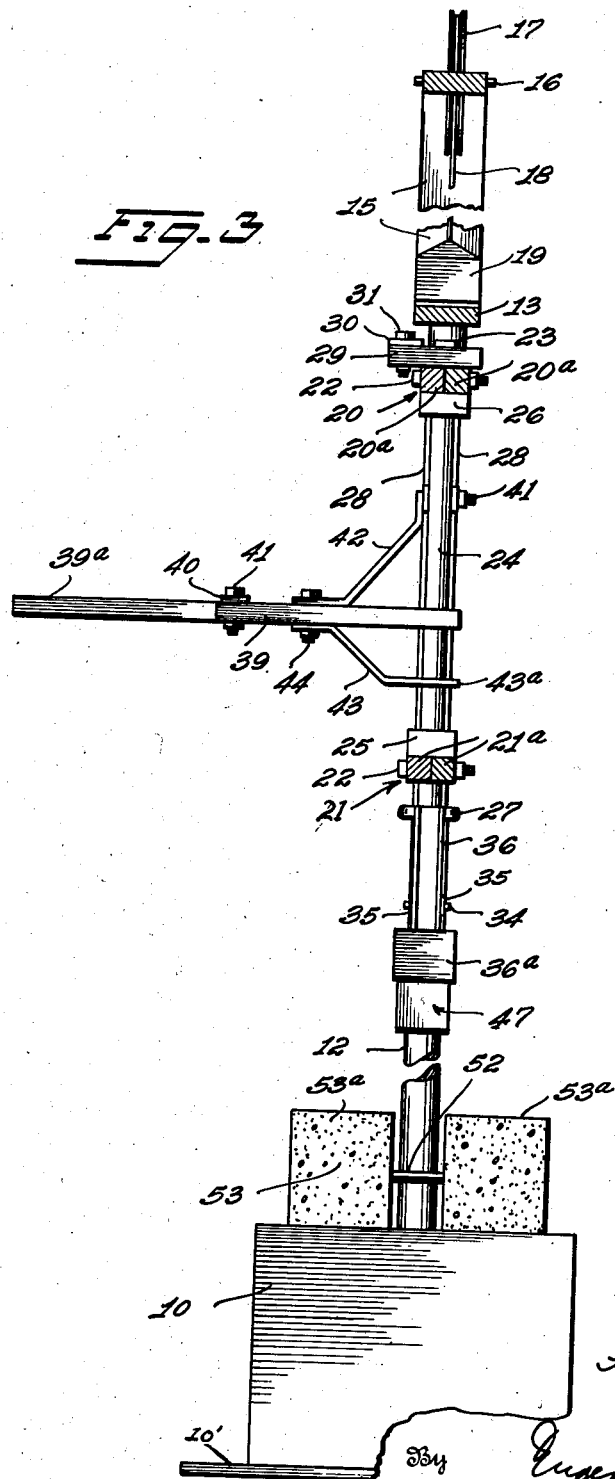

Patented Oct. 6, 1942

2,298,006

UNITED STATES PATENT OFFICE 2,298,006

MOLDING APPARATUS

Frank C. George, Orlando, Fla.

Application December 28, 1939, Serial No. 311,400

11 Claims. (Cl. 25—41)

My invention relates to molding apparatus and while it has to do especially with the formation of tile, building block or the like which is characterized by two spaced wall elements as characterized in my co-pending application Serial No. 210,329, filed May 27, 1938, yet nevertheless said molding apparatus is, in its broader aspects, susceptible of other application.

Briefly and generally stated, the invention has for one of its primary objects to provide in a molding apparatus novel means for quickly and accurately inserting and removing core elements, die elements or the like to and from operative relationship in respect to another molding member as, for instance a block mold, the nature of such means being such that it will be relatively inexpensive to manufacture, strong, durable and easy to operate.

The invention also resides in certain novel features of construction, combination and arrangement of the various parts and in modes of operation, all of which will be readily apparent to those skilled in the art upon reference to the accompanying drawings in connection with the detailed description appearing hereinafter.

It will be understood that while this specification and the drawings forming a part thereof deal with what is now regarded as the preferred embodiment of the invention, yet nevertheless the same is susceptible of other mechanical expressions within the spirit and scope of the subject matter claimed hereinafter.

In the drawings, wherein the same reference characters have been used to designate the same parts in all views—

Figure 1 is a perspective view of a mold embodying my invention;

Figure 2 is a front elevational view of the mold and core inserting apparatus;

Figure 3 is a vertical sectional view taken on the line 3—3 of Figure 2.

Figure 4 is an edge elevational view of one of the core or die elements.

Figure 5 is a section on the line 5—5 of Figure 2.

Figure 6 is a diagrammatic vertical section through the mold.

Referring to the drawings by reference characters, numeral 10 designates a block mold of rectangular form which provides the rectangular recess 10a. Within the recess 10a are provided the boss-like protuberances 11 which, as shown, are spaced from one another and from the proximate walls of mold 10. These boss-like protuberances 11 may be made of any material in accordance with usual practice in the art, and they may be formed in a wide variety of shapes. In the present instance however, such bosses 11 are indicated as being somewhat frusto-pyramidal in that they have flattened tops substantially in a plane with the top wall of the mold 10 while their side walls slope laterally outward as indicated at 11b so that such bosses occupy a greater area at the bottom than they do at the top. This arrangement makes it easier to withdraw the molded block or other article from the block mold member 10.

The block mold 10 has, or may have, resting upon its bottom about the boss-like protuberances 11, a vertically operable floor or plunger 60 for raising the finished block out of the mold after it has set. But as this is old in the art and no novelty is claimed therefor, I have not shown said vertically movable plunger or floor in the drawings except diagrammatically in Figure 6.

Attention is directed to the fact that opposed walls of bosses 11; the inner end wall surfaces of the mold 10 and the boss walls opposed thereto each provide opposed relatively wide seats 11a opening from the top of mold 10 and extending to the bottom thereof. The purpose of this is to receive the die or core elements 47 which will be hereinafter described. It will be noted that the seats 11a are disposed in the present instance midway between the intersecting sides of said bosses 11.

Figure 2 illustrates that the ends of the block mold member 10, or its base or mounting 10', have the medially positioned upstanding columns or posts 12 and that the upper ends of the latter are connected by the cross member 13 which carries the upstanding arch 15. Columns 12 are preferably tubular and are rigidly fastened to the frame work of the machine, and cross member 13 is bolted as at 14 to the upper ends thereof. The upper end of the arch 15 has the bearing support 16 for the pulley 17 over which is trained the cable 18 having at one end the weight 19 while the other end is connected to the upper rail 20 of a vertically movable frame, which comprises in addition to the upper rail 20 a lower rail 21. These two rails of the vertically movable frame have the sliding guide connection 20b, 21b with the upstanding posts 12.

As best shown in Figure 3, the top and bottom rails 20, 21' of the vertically movable frame comprise the companion sections 20a, 21a, respectively, which are tightly drawn together by means of the tie-bolts 22 which are arranged at spaced intervals in the direction of the length of the rail sections 20a, 21a, as best shown in Figure 2.

Figure 2 illustrates that the upper rail sections 20a grip, and hold against turning, the upper ends of the depending rods 23. As illustrated in Figures 2 and 3, a sleeve 24 surrounds each of the rods 23 from a point just below the upper rail 20 to a point below the lower rail 21 of said slidable frame; and Figure 2 best illustrates that the lower end of each of said sleeves 24 has keyed thereon the cam element 27 (Figure 5). The function of these cam elements 27 will be explained later on herein.

In order to properly support the sleeves 24 which surround the rods 23 between the rails 20, 21 I provide the upper and lower collars 26, 25 which are rigidly secured to said sleeves 24 by means of set screws or the like 26a, 25a, respectively. It will be observed that the upper collars 26 are fastened to their sleeves 24 so that the outer faces of said collars will bear against the upper rail 20 of the slidable frame and that the lower collars 25 are fastened to said sleeves 24 so that the lower faces of said collars will bear against the lower rail 21. From the foregoing it will be evident that each of the sleeves 24 is rotatably supported on its rod 23 between the upper and lower rails 20, 21 of the vertically slidable frame but that the rod 23 which is within each of the sleeves is held fast against movement. Therefore, turning of the sleeves 24 will cause rotation of the respective cams 27.

At this point it might be observed that the top and bottom rails 20, 21 of the vertically slidable frame have the vertical connecting rails 28 which are preferably arranged in pairs at opposite sides of rails 20, 21 and are spaced in the direction of the length of said rails 20, 21 as best illustrated in Figure 2.

Figures 2 and 3 also illustrate that each of the rods 23 has secured to its upper end a transverse strip or cleat element 29. These cleat elements 29 are connected by means of a tie-rod 30 which is secured to said cleat elements by means of bolts or the like 31. It might be observed, in this connection that said cleat elements 29 will preferably be fastened to the upper surface of the top rail 20; and that likewise they will have binding engagement with the rods 23 so as to provide a further means for preventing turning of said rods in the gripping bearings which are provided by the sections 20a of the top rail 20 of said vertically slidable frame which is carried by the standards 12.

The lower end of each of the fixed non-rotatable rods 23 has keyed thereon, as indicated at 33, a block element 32. Each block element has the pivot connections 34 with the inwardly extending bearing elements 35 of the gripper arms 36. Figure 2 illustrates that each block element 32 carries two gripper arms 36 which are arranged in opposition to one another and also that the pivots 34 are disposed at a point between the ends of said arms 36.

The lower ends of the gripper arms 36 terminate in flanged gripping portions or jaws 36a which, as will be hereinafter explained, are adapted to grip and embrace opposite sides of a core or die element 47 such as is illustrated in Figure 4, and to which further reference will be had as the description proceeds.

The upper ends of companion gripper members 36 are connected by coil springs so as to cause the opposed inner surfaces of the upper end portions of said companion gripper elements to maintain constant bearing contact with diametrically opposite portions of the interposed cam element 27 (Fig. 5) which, as hereinbefore intimated, is carried by the rotatable sleeve element 24. It will be quite evident then, that upon rotation of the respective sleeve elements 24 upon the respective carrier rods 23 the cams 27 will be turned so as to either cause the gripping ends 36a of grippers 36 to firmly embrace the die or core elements 47 or release same according to the desire of the operator of the machine.

Each of the sleeves 24 has the laterally extending arm 39 or 39a indicated in Figure 2. The outermost sleeves shown in Figure 2 have the arms 39 while the intermediate sleeve 24 has the control lever arm 39a. These arms 39, 39a are preferably keyed or otherwise fastened at their inner ends to their respective sleeves 24. A connector strip 40 is bolted as at 41 to each of the arms 39, 39a so that they will be moved in unison or simultaneously upon sideward manipulation of the lever 39a. In other words the gripper jaws 36 will be simultaneously operated to either grip or release the die or core elements 47 which are carried thereby upon manipulation of lever 39a.

Aside from its function as a control member for the respective sleeves 24 and cams carried thereby, the lever 39 also serves as a means for raising and lowering the frame. In carrying out this phase of the invention I provide the upper and lower bracket members 42, 43 respectively. The inner end of each of these bracket members 42, 43 is bolted to the lever member 39a as indicated at 44. The other end of the bracket member 43 is suitably secured as at 43a to the sleeve 24 of the intermediate unit while the upper end of the upper bracket member 42 has the clamp connection 45 with said sleeve 24 of the intermediate unit.

Coming now to the die or core element or elements 47 it will be noted that the same comprise the companion jaws 47a, 47a whose upper ends are pivotally connected by means of the hinge element 48. Each jaw has its inner face cored out to provide the diametrically opposite recess providing a transverse bore 49 which receives the coil spring 50 which tends to spread the said jaws 47a, 47a apart. Each of the jaws 47a has the transverse groove 51. These grooves are opposed to one another and are adapted to receive the tie-rods 52 which serve to connect the opposed sections 53a of the finished block elements 53.

The operation of the molding apparatus herein described may be summarized as follows:

The die or core elements 47 carrying tie rods 52 having been assembled in their respective grippers 36, 36, the operator grasps the control lever 39a and pulls it downwardly until the die, or core elements 47 are properly located in their respective seats or grooves 11a, in the mold 10 and are moved to the bottom thereof. It will be understood that the upper ends of the core elements 47 are spaced from the backs of seats or grooves 11a and preferably extend above the top of mold 10 so as to admit of entry of the die-gripping jaws 36a into mold 10 when placing the dies 47 in position. Then the lever 39a is swung sidewise to swing the sleeves 24 to turn cams 27 and permit springs 38 to release the gripping, or jaw ends, 36a of jaws 36 from the respective die or core elements 47.

Now the vertically slidable frame 20, 21, 28 with sleeves 24 and rods 23 is elevated by means of lever 39a to a position out of the way—so that the concrete or other plastic can be disposed in the mold 10 and vibrated. The material when poured in the block mold is of sufficient consistency that the block can be immediately removed on the pallet and the whole operation of making the same is about a minute and the blocks are then set out to cure.

Since the block is immediately formed it is elevated partially out of the mold (see Figs. 2 and 3) by elevating the previously mentioned vertically movable mold floor 60. When this upward vertical movement has taken place the divergent taper of the backs of opposed seats or grooves 11a will have permitted springs 50 to spread die jaws 47a to entirely clear 51, 51 thereof (see Figs. 2 and 4) from the tie rods 52. Such elevation of the block seats the dies 47 in the jaws 36 once more and the lever 39a is swung sidewise to cause the pairs of jaws 36, 36a to again engage their respective die or core elements 47 lightly and not sufficiently to again close the portions 51, 51 on the rod 52. Then frame 20, 21, 28 is raised to withdraw the die or core elements out of the finished block. In this connection the divergence of the back walls of opposed mold seats 11a permits slight opening of the respective jaw pairs 36, 36a when they are put in place, so that the rods 52 will be held by the opposed jaw groove seats 51 only sufficiently tightly to retain the said rods 52 in place, while the plastic block material is being poured and vibrated. Thus, when the block is raised the core element 47 is elevated directly into the grippers 36 and as the block is raised out of the mold the spring in the core element 47 is automatically released or opened by pressure of spring 50 and the tie rod 52 is free. The dies 47 are thus free to be raised with the frame and are ready for the next block.

The weight, pulley and cable connection, 19, 18, and 17 with frame 20, 21, 28 makes the latter easy to operate up and down by lever 39a—because said weight acts as a counterbalance.

My apparatus makes for very rapid handling of the core elements 47, and tie rods 52 because a plurality of same can be handled at the same time, thus eliminating necessity for individual insertion and removal of said die or core elements.

For convenience in illustration I have shown my core inserter and remover applied to but a single mold 10, but it will be obvious that it can be applied in multiple to any number of molds 10.

Of course the function of the grooves 11a is simply to guide the dies 47. It will be obvious that they can be dispensed with.

Having thus described my invention, what I claim as new is:

1. The combination of a mold comprising a main member and a plurality of removable core members, a vertically movable support, guide means for said support, carrier means for said core members and carried by said support, a pair of laterally separable gripper jaws for each of said core members and incorporated in said carrier means, and means including a cam for actuating said gripper jaws to and from operative position.

2. The combination of a mold comprising a main member and a plurality of removable core members, a vertically movable support, guide means for said support, carrier means for said core members and carried by said support, a pair of laterally separable gripper jaws for each of said core members and incorporated in said carrier means, and individual cam-incorporating actuating means for said gripper jaws for actuating the same to and from an operative position.

3. The combination of a mold comprising a main member and a plurality of removable core members, a vertically movable support, guide means for said support, carrier means for said core members and carried by said support, a pair of laterally separable gripper jaws for each of said core members and incorporated in said carrier means, individual cam-incorporating actuating means for said gripper jaws for actuating the same to and from an operative position, and a common control member for said cam-incorporating actuating means.

4. The combination of a mold comprising a main member and a plurality of removable core members, a vertically movable support, guide means for said support, carrier means for said core member and carried by said support, a pair of laterally separable gripper jaws for each of said core members and incorporated in said carrier means, and individual cam-incorporating actuating means for said gripper jaws carried by said vertically movable support for moving said gripper jaws to and from operative position.

5. The combination of a mold comprising a main member and a plurality of removable core members, a vertically movable support, guide means for said support, carrier means for said core members and carried by said support, a pair of laterally separable gripper jaws for each of said core members and incorporated in said carrier means, individual cam-incorporating actuating means for said gripper jaws, carried by said vertically movable support for moving said gripper jaws to and from operative position, and a common control member for said cam-incorporating actuating means.

6. The combination of a mold comprising a main member and a plurality of removable core members, a vertically movable support, guide means for said support, carrier means for said core members and carried by said support, a pair of lateral separable gripper jaws for each of said core members and incorporated in said carrier means, individual cam-incorporating actuating means for said gripper jaws for moving the same to and from operative position, a common control member for said cam-incorporating actuating means, and a counterbalance means for said carrier means, said counterbalance means being connected to said carrier means and to its support.

7. Block molding apparatus comprising in combination, a block mold, a plurality of separable core elements cooperable therewith, opposed cooperating laterally separable grippers for each of said core elements, a carrier rod for each pair of said opposed grippers, pivot means connecting each pair of grippers to a different carrier rod, a movable frame having means rigidly securing said carrier rods against turning, means for guiding said frame in movement toward and from said block mold, a sleeve rotatable on each of said carrier rods, a cam on each of said sleeves and operatively engaging the gripper elements carried thereby for moving the same to and from operative position, and operating means for said cams.

8. Block molding apparatus comprising in combination, a block mold, a plurality of separable core elements cooperable therewith, opposed cooperating laterally separable grippers for each of said core elements, a carrier rod for each pair of said opposed grippers, pivot means connecting each pair of grippers to a different carrier rod, a movable frame having means rigidly securing said carrier rods against turning, means for guiding said frame in movement toward and from said block mold, a sleeve rotatable on each of said carrier rods, a cam on each of said sleeves and operatively engaging the gripper elements carried thereby for moving the same to and from operative position, and operating means for said cams and including a common control lever.

9. Block molding apparatus comprising in combination, a block mold, a plurality of separable core elements cooperable therewith, opposed cooperating grippers for each of said core elements, a carrier rod for each pair of said opposed grippers, pivot means connecting each pair of grippers to a different carrier rod, a movable frame having means rigidly securing said carrier rods against turning, means for guiding said frame in movement toward and from said block mold, a sleeve rotatable on each of said carrier rods, a cam on each of said sleeves and operatively engaging the gripper elements carried thereby for moving the same to and from operative position, operating means for said cams and including a common control lever, and brace means connecting said control lever to one of said sleeves whereby said lever serves as an actuator for said movable frame.

10. In a molding apparatus comprising fixed and movable members, a movable frame, guide means for said frame, laterally separable gripper elements carried by said movable frame, and a common means for moving said frame and actuating said gripper elements to and from gripping position.

11. In a molding apparatus comprising fixed and movable members, a movable frame, guide means for said frame, laterally separable gripper elements carried by said movable frame, a common means for moving said frame and actuating said gripper elements to and from gripping position, and a counterbalance means for said movable frame connected thereto and to its guide means.

FRANK C. GEORGE.